(12) United States Patent
Maughan et al.

(10) Patent No.: US 11,172,270 B2
(45) Date of Patent: *Nov. 9, 2021

(54) SYSTEMS AND METHODS FOR DISCOVERY OF, IDENTIFICATION OF, AND ONGOING MONITORING OF VIRAL MEDIA ASSETS

(71) Applicant: Rovi Guides, Inc., San Jose, CA (US)

(72) Inventors: Benjamin H. Maughan, Pleasanton, CA (US); Sean Matthews, Los Altos, CA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/114,969

(22) Filed: Dec. 8, 2020

(65) Prior Publication Data

US 2021/0152895 A1 May 20, 2021

Related U.S. Application Data

(63) Continuation of application No. 16/608,803, filed as application No. PCT/US2017/030107 on Apr. 28, 2017, now Pat. No. 10,924,819.

(51) Int. Cl.
*H04N 21/84* (2011.01)
*G06F 16/783* (2019.01)
*H04N 21/234* (2011.01)
*H04N 21/24* (2011.01)

(52) U.S. Cl.
CPC .......... *H04N 21/84* (2013.01); *G06F 16/783* (2019.01); *H04N 21/23418* (2013.01); *H04N 21/2407* (2013.01)

(58) Field of Classification Search
CPC ............ H04N 21/84; H04N 21/23418; H04N 21/2407; G06F 16/783; H04H 60/73
See application file for complete search history.

(56) References Cited

U.S. PATENT DOCUMENTS

| | | | |
|---|---|---|---|
| 9,311,406 B2* | 4/2016 | Ma | G06F 16/951 |
| 9,705,945 B1* | 7/2017 | Lewis | H04L 65/607 |
| 9,749,431 B1* | 8/2017 | Cashmore | G06Q 30/02 |
| 2006/0089948 A1* | 4/2006 | Picker | H04N 21/8586 |

(Continued)

*Primary Examiner* — John R Schnurr
(74) *Attorney, Agent, or Firm* — Haley Guiliano LLP

(57) ABSTRACT

Systems and methods are provided herein for automatically generating universal metadata for non-linear content when the non-linear content is determined to be viral. To this end, the systems and methods determine a first rate at which first users are consuming non-linear content from a first source. In response to determining that the first rate exceeds the threshold, the systems and methods determine a second source that from which second users are consuming the non-linear content, and a second rate at which the second users are consuming the non-linear content from the second source. In response to determining that the second rate exceeds the threshold, the systems and methods generate universal metadata for the non-linear content by automatically populating metadata fields of by scraping metadata fitting predefined criteria corresponding to the metadata fields from the first source and from the second source, and store the populated metadata fields to a database.

18 Claims, 6 Drawing Sheets

(56) References Cited

U.S. PATENT DOCUMENTS

| | | | |
|---|---|---|---|
| 2009/0092183 A1* | 4/2009 | O'Hern | H04N 21/44209 375/240.01 |
| 2011/0289114 A1* | 11/2011 | Yu | H04N 21/4331 707/769 |
| 2011/0289121 A1* | 11/2011 | Pirkner | H04N 21/8133 707/805 |
| 2012/0284738 A1* | 11/2012 | Narasimhan | H04N 21/25891 725/16 |
| 2013/0013583 A1* | 1/2013 | Yu | G06F 16/738 707/709 |
| 2014/0143228 A1* | 5/2014 | Blue | H04L 51/32 707/709 |
| 2014/0201774 A1* | 7/2014 | Neumeier | H04N 21/462 725/19 |
| 2014/0325401 A1* | 10/2014 | Wattenhofer | H04N 21/44204 715/760 |
| 2016/0353144 A1* | 12/2016 | Gopalan | H04N 21/4532 |
| 2016/0381436 A1* | 12/2016 | Yu | H04N 21/2187 725/19 |
| 2017/0055014 A1* | 2/2017 | Bou Balust | H04N 21/251 |
| 2017/0150195 A1* | 5/2017 | Yu | H04N 21/2404 |
| 2017/0187770 A1* | 6/2017 | Paul | H04N 21/2743 |
| 2017/0187772 A1* | 6/2017 | Paul | H04N 21/8456 |
| 2020/0128303 A1* | 4/2020 | Zhao | H04N 21/8358 |

* cited by examiner

SYSTEMS AND METHODS FOR DISCOVERY OF, IDENTIFICATION OF, AND ONGOING MONITORING OF VIRAL MEDIA ASSETS

CROSS-REFERENCE TO RELATED APPLICATIONS

This application is a continuation of U.S. patent application Ser. No. 16/608,803, filed on Oct. 25, 2019, which is a national stage application under 35 U.S.C. § 371 of International Application PCT/US2017/030107, filed Apr. 28, 2017. The disclosures of each referenced application are hereby incorporated by reference herein in their entireties.

BACKGROUND

In related art systems, editors know in advance what programming will be released, and thus are able to manually generate metadata corresponding to that program. The metadata is then used to populate guidance information, such as information used in an interactive television program guide. In modern days, huge amounts of content is released by users who generate their own content. Editors do not know about the content until it is uploaded by the users. Moreover, because of the volume of user-released content, it is impossible for editors to reactively generate metadata for this content.

SUMMARY

Systems and methods are disclosed herein for automatically generating universal metadata for non-linear content when the non-linear content is determined to be viral (e.g., popular or temporally popular) content. By performing this automatic processing for viral content, applications will be able to leverage the universal metadata in various ways, such as in ways that enhance the user's experience in consuming the viral content. Moreover, by exercising this automatic processing for viral content but not necessarily for other user-uploaded content, efficiencies are achieved by refraining from taking up storage space for the huge amount of user-uploaded content that is unpopular (which can be billions upon billions of individual content, if not more).

To this end and others, in some aspects of the disclosure, a media guidance application determines a first rate at which first users are consuming non-linear content from a first source. For example, the media guidance application may determine the first rate to be a speed at which the first users are accessing the non-linear content from the first source during a predetermined time interval. As another example, the media guidance application may compute a derivative of the speed to determine an acceleration at which the first users are accessing the non-linear content from the first source during the predetermined time interval. The media guidance application may then assign the first rate to be equal to the acceleration.

In some embodiments, the media guidance application may determine whether the first rate exceeds a threshold. In response to determining that the first rate exceeds the threshold, the media guidance application may generate a fingerprint by fingerprinting the non-linear content. For example, to generate the fingerprint, the media guidance application may sample a portion of the non-linear content from the first source, and may determine, from the sample, unique characteristics of the non-linear content. The media guidance application may then assign the unique characteristics of the non-linear content as the fingerprint.

In some embodiments, the media guidance application may crawl a plurality of content sources and may generate a plurality of fingerprints by fingerprinting non-linear content offered by each content source of the plurality of content sources. The media guidance application may then determine whether a matching fingerprint that matches the fingerprint is within the plurality of fingerprints.

For example, the media guidance application may determine whether a matching fingerprint that matches the fingerprint is within the plurality of fingerprints by first sampling a portion of the non-linear content from the second source, and determining, from the sample of the portion of the non-linear content from the second source, second unique characteristics of the non-linear content from the second source. The media guidance application may compare the unique characteristics of the non-linear content to the second unique characteristics, and may determine that the matching fingerprint is within the plurality of fingerprints in response to determining, based on the comparing, that a predetermined amount of the unique characteristics of the non-linear content match the second unique characteristics.

In some embodiments, the media guidance application, in response to determining that the matching fingerprint is within the plurality of fingerprints, may determine a second rate at which second users of a second content source corresponding to the matching fingerprint are consuming the non-linear content from the second content source. In response to determining that the second rate exceeds the threshold, the media guidance application may generate universal metadata for the non-linear content by retrieving predefined criteria corresponding to metadata fields (e.g., retrieving known keywords, where the known keywords, if found, are predefined to fit within certain metadata fields). The media guidance application may then search the first content source and the second content source for metadata corresponding to the predefined criteria. The media guidance application may store metadata found by the searching in a database entry designated for the universal metadata for the non-linear content.

In some embodiments, the universal metadata includes a universal identifier. The media guidance application may generate the universal identifier in various ways. For example, in some embodiments, the media guidance application may generate the universal identifier by assigning the fingerprint to be the universal identifier. In some embodiments, the media guidance application may execute a predefined code script to generate the universal identifier. In some embodiments, the media guidance application may add a unit to a base identifier that is sequentially incremented by the unit for each newly generated universal identifier.

In some embodiments, the media guidance application may generate the universal metadata by generating a unique identifier of the first source and the second source (e.g., a label of where the non-linear content was encountered). The media guidance application may then generate, in connection with each unique identifier, indicia of unique attributes corresponding to a respective version of the non-linear content offered by each of the first source and the second source. For example, the unique attributes may indicate quality, length, parental control ratings, and the like.

In some embodiments, the media guidance application may monitor the first rate and the second rate, and may determine whether either the first rate or the second rate exceeds a second threshold that is higher than the threshold. In response to determining that either the first rate or the second rate exceeds the second threshold, the media guidance application may generate an alert to be output to an operator.

In some embodiments, further in response to determining that either the first rate or the second rate exceeds the second threshold, the media guidance application may access entries of a knowledge graph that defines relationships and strengths of relationships between various content based on metadata corresponding to that content. The media guidance application may transmit a command to the knowledge graph to determine relationships corresponding to the universal metadata, and may receive the determined relationships from the knowledge graph. The media guidance application may then supplement the universal metadata with the determined relationships.

In some embodiments, the media guidance application, further in response to determining that either the first rate or the second rate exceeds the second threshold, may determine whether the universal metadata includes metadata for a threshold amount of the metadata fields (i.e., was a sufficient amount of metadata found to populate, e.g., information for a guidance application?). In response to determining that the universal metadata includes metadata for the threshold amount of the metadata fields, the media guidance application may refrain from generating the alert, as flagging an operator is not necessary if enough metadata was scraped. In response to determining that the universal metadata does not include metadata for the threshold amount of the metadata fields, the media guidance application may proceed to generate the alert.

In some embodiments, the media guidance application may generate for display, to a user, based on the universal metadata, a content identifier that identifies the non-linear content. The media guidance application may receive a selection of the content identifier, and, in response to receiving the selection, the media guidance application may generate for display, based on the universal metadata, attributes of the non-linear content.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
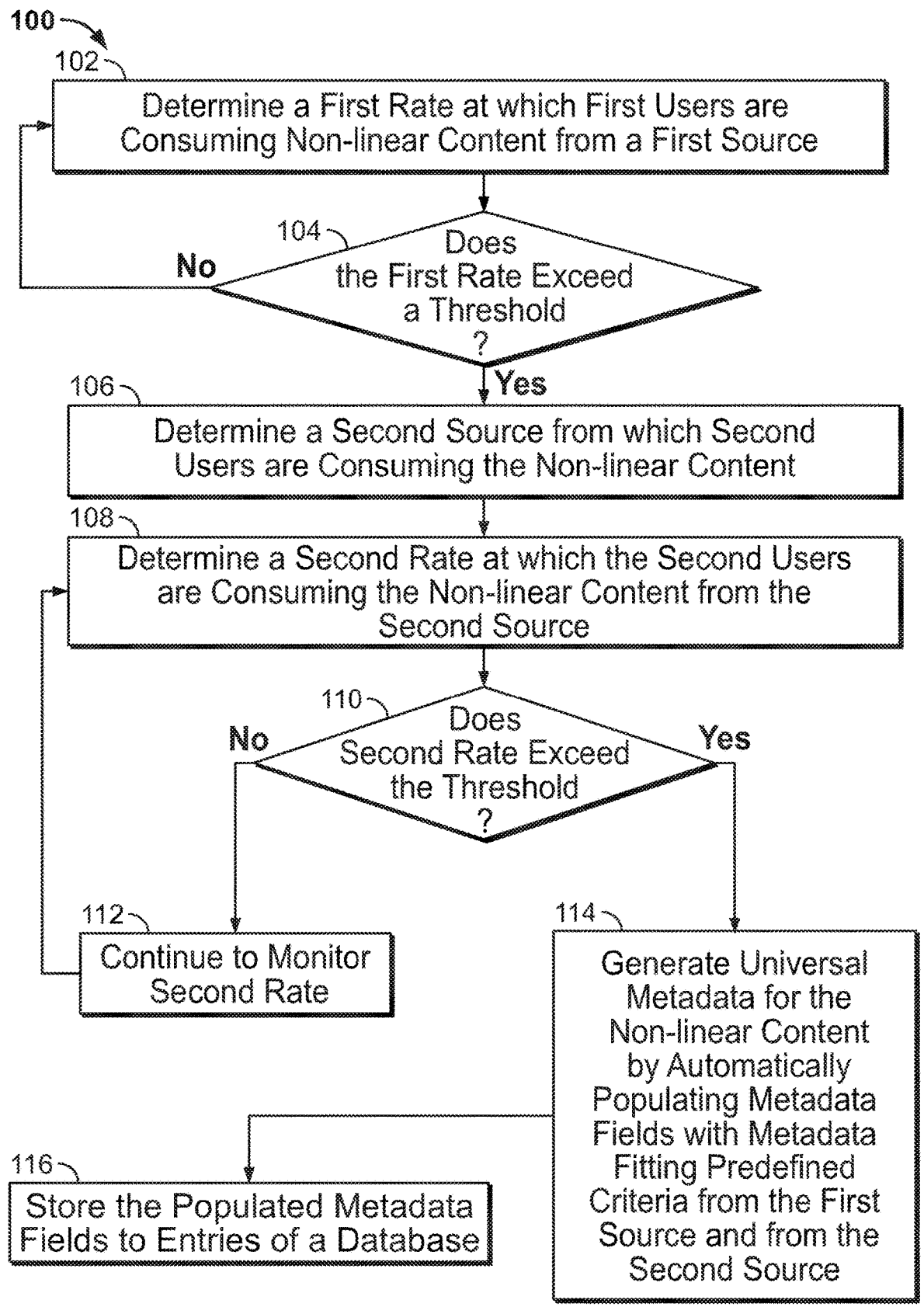
FIG. 1 depicts an illustrative flowchart of a process for automatically generating universal metadata for a viral video, in accordance with some embodiments of the disclosure.

FIG. 1 depicts an illustrative flowchart of a process for automatically generating universal metadata for a viral video, in accordance with some embodiments of the disclosure. Process 100 begins at 102, where a media guidance application installed at user equipment and/or a server determines a first rate at which first users are consuming non-linear content from a first source. As used herein, the term "rate" is defined to mean a pace at which users are accessing a particular piece of content. The pace may be any measurement of pace, including speed, velocity, acceleration, and the like.

As used herein, the term "viral" is defined to mean content that is accessed by users at a rate that is high relative to rates that users are accessing other content. Determining whether the rate is relatively high may be based on comparing the rate to a static, predefined threshold, or may be based on comparing the rate to a dynamic threshold that adjusts based on a present rate at which other content is being accessed. Manners in which the dynamic threshold may be computed are described in further detail below.

As used herein, the term "non-linear content" refers to unscheduled content that can be accessed by users at any time that the users desire. For example, on-demand media, streaming media that begins upon command, user-uploaded media that begins playback upon command, and the like are non-linear content. Non-linear content is distinguished from linear content, which is content that is transmitted to users on a curated schedule (e.g., broadcast television programs).

In some embodiments, the media guidance application may determine the first rate to be a speed at which the first users are accessing the non-linear content from the first source during a predetermined time interval. The speed may be calculated based on, e.g., amount of access attempts (e.g., website links selected or clicked, or links on any other platform) to the non-linear content by way of the first source over a known period of time. In some embodiments, the media guidance application may determine the first rate to be an acceleration at which the first users are accessing the non-linear content from the first source during a predetermined time interval. For example, the media guidance application may compute a derivative of the speed to determine an acceleration at which the first users are accessing the non-linear content from the first source during the predetermined time interval. The acceleration would indicate a rate at which the speed of user access to the non-linear content by way of the first source is increasing or decreasing.

Process 100 continues to 104, where the media guidance application determines whether the first rate exceeds a threshold. In some embodiments, the media guidance application may retrieve the threshold from a database (e.g., either from local storage or remote storage, as will be described further with respect to FIGS. 2-5 below). In some embodiments, the media guidance application may calculate the threshold. The media guidance application may calculate the threshold based on rates at which other popular non-linear content is being accessed at the present time, or at a predefined window preceding the present time.

As an example, if there are five distinct non-linear content that are presently viral, the media guidance application may calculate the threshold based on the rate on which the presently viral video is being accessed. For example, the media guidance application may perform any known mathematical function on the rates of the five distinct non-linear content, such as averaging, taking the lowest or highest value, the median, the mean, etc. The output of any mathematical function (or any combination thereof) of the rates of presently viral videos may be set to be the value of the threshold.

If the media guidance application determines that the first rate exceeds the threshold, process 100 continues to 106. If on the other hand, the media guidance application determines that the first rate does not exceed the threshold, process 100 reverts to 102, where the media guidance application continues to monitor the first rate.

At 106, the media guidance application determines a second source from which second users are consuming the non-linear content. The media guidance application may determine the second source in a variety of manners. In some embodiments, the media guidance application may crawl sources of non-linear content (e.g., websites and other platforms known to the media guidance application to host non-linear content, websites and other platforms indicated by an index to host non-linear content, and the like). The media guidance application may determine whether the second source contains the same non-linear content using various processes. In some embodiments, the media guidance application may determine whether the second source contains the same non-linear content by comparing metadata indicated by the first source (e.g., title, description, etc. of the non-linear content of the first source) to similar metadata indicated by the second source, and depending whether a threshold amount of the metadata matches.

In some embodiments, the media guidance application may determine that no metadata is available from the first source to describe the non-linear content. For example, the non-linear content may be content generated by a user, and thus may be unknown to the media guidance application and may have no corresponding metadata, or insufficient metadata. In such a scenario, the media guidance application may, in some embodiments, compare electronic communications about the non-linear video from the first source to similar electronic communications from the second source. For example, if a page on which the non-linear video may be viewed has a chat feed, the media guidance application may monitor the communications of the chat feed and may compare them to communications of a chat feed from the second source. If sufficient keywords of the chat feed match between the first source and the second source, the media guidance application may determine that the second source contains the same non-linear video as the first source. Any known comparison algorithm may be used to determine whether sufficient keywords match.

In some embodiments, the media guidance application may determine whether the second source contains the same non-linear content as the first source by performing a comparison of the characteristics of the non-linear content offered by the first source and the second source. The characteristics may be learned by the media guidance application fingerprinting the non-linear content. To generate the fingerprint, the media guidance application may sample a portion of the non-linear content from, e.g., the first source. In the case that the non-linear content is audio, the sample may be a predetermine length of the audio. In the case that the non-linear content is video, the sample may be a portion of a still frame (e.g., a defined set of pixels within a still frame), an entire still frame, a defined set of pixels within a plurality of still frames, or an entirety of a plurality of still frames. The media guidance application may sample all other forms of media in a similar manner.

In some embodiments, the media guidance application may determine, from the sample, unique characteristics of the non-linear content. For example, the media guidance application may delete portions of the sample that are known to be common to many media assets. For example, edges, blue sky or night sky, moments of silence in audio tracks, and any other common portion of a sample may be deleted. The media guidance application may determine which portions of the sample are common by using a lookup table that indicates known common portions, and comparing each portion of the sample against entries of the lookup table. The remaining portions of the sample are unique characteristics. If no unique characteristics, or insufficient characteristics, remain after this comparison, the media guidance application may sample a different portion of the non-linear content until the media guidance application identifies unique characteristics of the non-linear content. The media guidance application may then assign the unique characteristics of the non-linear content as the fingerprint.

In some embodiments, the media guidance application may crawl a plurality of content sources and may generate a plurality of fingerprints by fingerprinting non-linear content offered by each content source of the plurality of content sources. The media guidance application may then determine whether a matching fingerprint that matches the fingerprint is within the plurality of fingerprints.

For example, the media guidance application may determine whether a matching fingerprint that matches the fingerprint is within the plurality of fingerprints by first sampling a portion of the non-linear content from the second source, and determining, from the sample of the portion of the non-linear content from the second source, second unique characteristics of the non-linear content from the second source. The media guidance application may compare the unique characteristics of the non-linear content to the second unique characteristics, and may determine that the matching fingerprint is within the plurality of fingerprints in response to determining, based on the comparing, that a predetermined amount of the unique characteristics of the non-linear content match the second unique characteristics.

The media guidance application may also generate a fingerprint for the non-linear content at the second source. The media guidance application may compare the fingerprint of the first source to the fingerprint of the second source, and determine whether they match. Comparison of fingerprints, and a determination as to whether the fingerprints match, is discussed at further length in commonly owned U.S. patent application Ser. No. 14/919,425, filed Oct. 21, 2015, presently pending, the disclosure of which is hereby incorporated herein in its entirety. Process 100 may continue to 110, for example, if the media guidance application determines that the content from the first source matches the content from the second source using any process, such as the processes disclosed herein.

At 110, the media guidance application may determine whether the second rate exceeds the threshold. For example, similar to 104, the media guidance application may monitor rates at which sources other than the first source are accessed by users. If, at 110, the second rate does not exceed the threshold, process 100 proceeds to 112, where the media guidance application continues to monitor the second rate, and to this end, reverts back to 108. If, however, the second rate does exceed the threshold, then process 100 continues to 114. Moreover, the media guidance application may determine that the non-linear content is viral because the non-linear content is being viewed at a high rate from multiple sources.

At 114, the media guidance application may generate universal metadata for the non-linear content. As used herein, the term "universal metadata" is defined to mean metadata corresponding to newly identified viral non-linear content that may be used to universally identify the non-linear content. For example, as the same viral non-linear content is distributed to other content sources (e.g., by electronic communications between users, by other users re-uploading the non-linear content, by users modifying and manipulating the viral non-linear content, etc.), the universal metadata may be used to identify and catalog the non-linear content. The universal metadata may be updated to index various sources that host the non-linear content, and may be updated to indicate differences in versions (described further below) hosted by each different source. In some embodiments, at 106, no second source is determined from which second users are consuming the non-linear content. The media guidance application may nonetheless proceed to 114 from 104 if the first rate exceeds a different, higher threshold that requires a first rate that is substantially higher than the rate required to determine virality of content that is accessed at a high rate from two different sources.

In some embodiments, in order to generate the universal metadata, the media guidance application may retrieve predefined criteria corresponding to metadata fields. For example, the media guidance application may retrieve template metadata fields (e.g., including a blank title field, a blank description field, and the like). Each template metadata field may indicate keywords or other types of metadata (e.g., keywords, fingerprint, etc.) that, if found when crawling a platform that hosts the non-linear content, have a high likelihood of accurately populating the respective template metadata field.

In some embodiments, the media guidance application may search the first content source and the second content source for metadata corresponding to the predefined criteria. For example, the media guidance application may scrape text from pages of the first content source and the second content source that are hosting the non-linear content. The media guidance application may compare keywords from the scraped text to the metadata indicated by the template metadata fields. If the media guidance determines, from the comparison, that a match exists, the media guidance application may populate the respective metadata field with the keyword or keywords.

At 116, the media guidance application may store the populated metadata fields to entries of a database. For example, the media guidance application may store metadata found by the searching in a database entry designated for the universal metadata for the non-linear content. The media guidance application may later access the database entries for any known purpose (e.g., identifying non-linear content from another source, etc.).

In some embodiments, the universal metadata includes a universal identifier. As used herein, the term universal identifier is defined to mean an identifier that identifies the non-linear content in a manner that enables the media guidance application to determine an identity of the non-linear content, no matter its source. As will be described below, the universal identifier may be, for example, a fingerprint of the non-linear content, an identification code or string, and the like. Non-linear content may have a plurality of universal identifiers, each of which may be used to identify the non-linear content. The universal identifier may include additional information (e.g., additional bits, letters, or other indicia of auxiliary information such as version, source of origin, etc.).

In some embodiments, the media guidance application may generate the universal identifier by assigning the fingerprint to be the universal identifier. In some embodiments, the media guidance application may take multiple fingerprints of the non-linear content, each fingerprint indicating different unique characteristics of the non-linear content. The media guidance application may generate multiple universal identifiers, each universal identifier including a different fingerprint. As described above, additional information may be appended to the fingerprint, such as indicia of the source of the non-linear content. In some embodiments, the media guidance application may fingerprint a user interface of the source and append that fingerprint of the user interface to the fingerprint of the non-linear content to generate the universal identifier.

In some embodiments, the media guidance application may execute a predefined code script to generate the universal identifier. For example, a random or pseudo-random code script or a non-random algorithm may be used to generate the universal identifier and assign it permanently to the non-linear content. In some embodiments, the media guidance application may add a unit to a base identifier that is sequentially incremented by the unit for each newly generated universal identifier. For example, universal identifiers may be assigned on a sequential basis, where each time the media guidance application encounters unknown non-linear content, the media guidance application adds one unit to the last number assigned to the last-encountered unknown non-linear content.

In some embodiments, in addition to including auxiliary information with the universal identifier, or instead of including the auxiliary information with the universal identifier, the media guidance application may generate generating a unique identifier of the first source and/or the second source (e.g., a label of where the non-linear content was encountered) for inclusion in the universal metadata. The media guidance application may then generate, in connection with each unique identifier, indicia of unique attributes corresponding to a respective version of the non-linear content offered by each of the first source and the second source. For example, the unique attributes may indicate quality, length, parental control ratings, and the like. The media guidance application may identify the unique attributes for inclusion in the universal metadata by any known manner, such as an operator populating the unique attributes, the media guidance application scraping and analyzing keywords from the source (e.g., from user chat comments), the media guidance application analyzing quality, length, etc. directly from the non-linear content feed or stream, and the like.

In some embodiments, the media guidance application may determine whether the non-linear content is sufficiently important that its existence should be alerted to an editor.

For example, an extremely popular non-linear content may merit a human pair of eyes to look at and potentially edit the universal metadata populated for the non-linear content. To this end, the media guidance application may monitor the first rate and the second rate, and may determine whether either the first rate or the second rate exceeds a second threshold that is higher than the threshold, thus indicating that this viral content is unusually popular, even for viral content. In response to determining that either the first rate or the second rate exceeds the second threshold, the media guidance application may generate an alert to be output to an operator. The alert may include, for example, a user interface indicating each metadata field of the universal metadata, where each metadata field is editable by the editor/operator.

In some embodiments, in addition to alerting an editor or operator to unusually popular viral content, the media guidance application may determine that resources should be used to supplement the universal metadata by accessing a knowledge graph that relationships between various content based on metadata and other attributes corresponding to that content that are known to the knowledge graph. To this end, further in response to determining that either the first rate or the second rate exceeds the second threshold, the media guidance application may transmit a command to the knowledge graph to determine relationships corresponding to the universal metadata, and may receive the determined relationships from the knowledge graph. Alternatively, or additionally, natural language logic (e.g., of the knowledge graph), may be used to listen audio of the non-linear content, or scrape text from image/video frames of the non-linear content. The knowledge graph may be used to extract, of the audio or scraped text, metadata that describes the non-linear content. The media guidance application may then supplement the universal metadata with the determined relationships, and may supplement the knowledge graph with other metadata and information about the non-linear content. Thus, when a user inputs a search query about content related to the non-linear content, the knowledge graph as updated may cause a search engine to output search results including results for the non-linear content.

In some embodiments, the media guidance application may leverage the knowledge graph to determine a finer read of the first rate and/or the second rate. For example, the media guidance application, in addition to determining rates at which the non-linear content is accessed from various sources, may determine rates at which users chat about the non-linear content. To do so, the media guidance application may parse keywords from electronic communications (or spoken communications, as translated by using a natural language processor), and may compare the parsed keywords to entries of the knowledge graph to determine whether the parsed keywords refer to the non-linear content. The media guidance application may generate the first rate and/or the second rate by weighting rates at which users access the non-linear content differently from rates at which users chat about the non-linear content, and combine those weighted rates to calculate an aggregate first rate and/or second rate.

In some embodiments, the media guidance application, further in response to determining that either the first rate or the second rate exceeds the second threshold, may determine whether the universal metadata includes metadata for a threshold amount of the metadata fields. For example, the media guidance application may determine, for a particularly popular viral content, whether that an alert to the operator may be nonetheless unnecessary because the media guidance application was able to populate the important fields in the universal metadata. In response to determining that the universal metadata includes metadata for the threshold amount of the metadata fields, or for the important fields, the media guidance application may refrain from generating the alert, as flagging an operator is not necessary if enough metadata was filled in. On the other hand, in response to determining that the universal metadata does not include metadata for the threshold amount of the metadata fields, the media guidance application may proceed to generate the alert.

In some embodiments, the media guidance application may generate for display, to a user, based on the universal metadata, a content identifier that identifies the non-linear content. For example, the media guidance application may output a user interface including media asset identifiers for a plurality of media assets, where one of the media asset identifiers indicates the non-linear content, and where that media asset identifier, when selected, leads the user to view the non-linear content. The media guidance application may receive a selection of the content identifier, and, in response to receiving the selection, the media guidance application may generate for display, based on the universal metadata, attributes of the non-linear content (e.g., further information about the non-linear content), or may generate for display the non-linear content itself.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
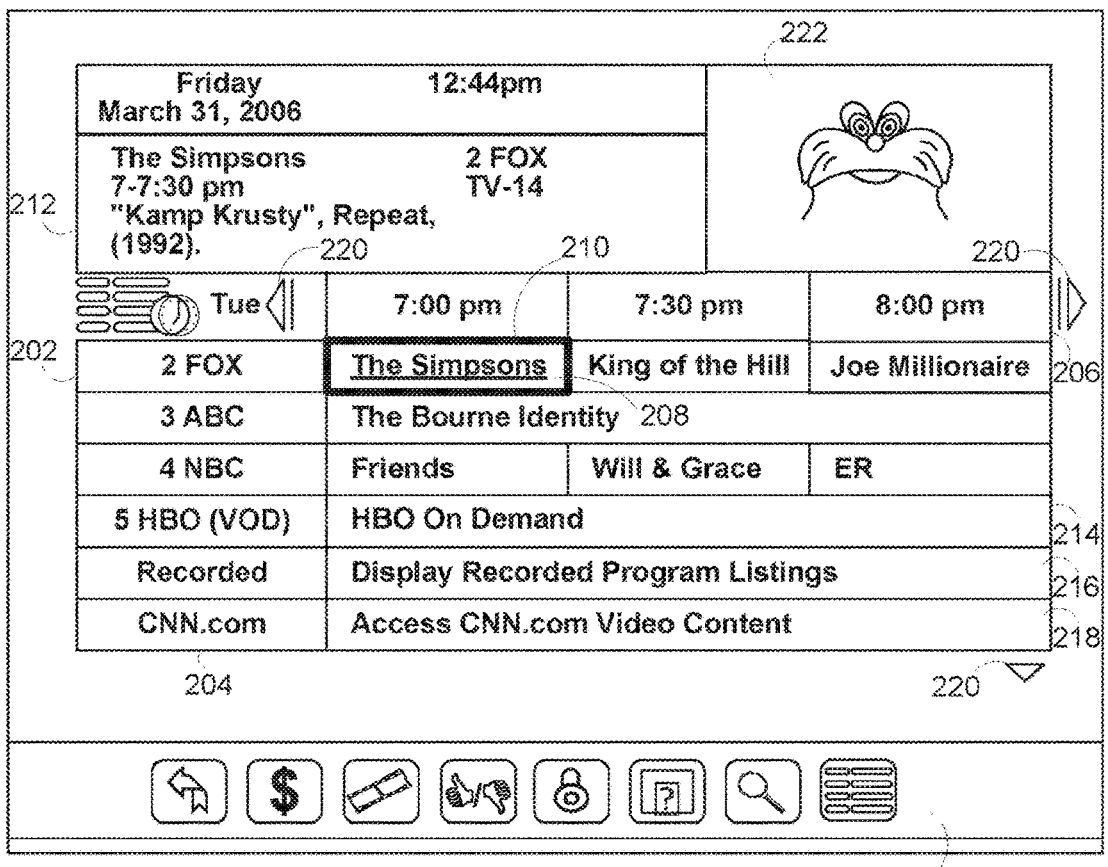
FIG. 2 shows an illustrative embodiment of a display screen that may be used to provide media guidance application listings and other media guidance information, in accordance with some embodiments of the disclosure.
Figure 3:
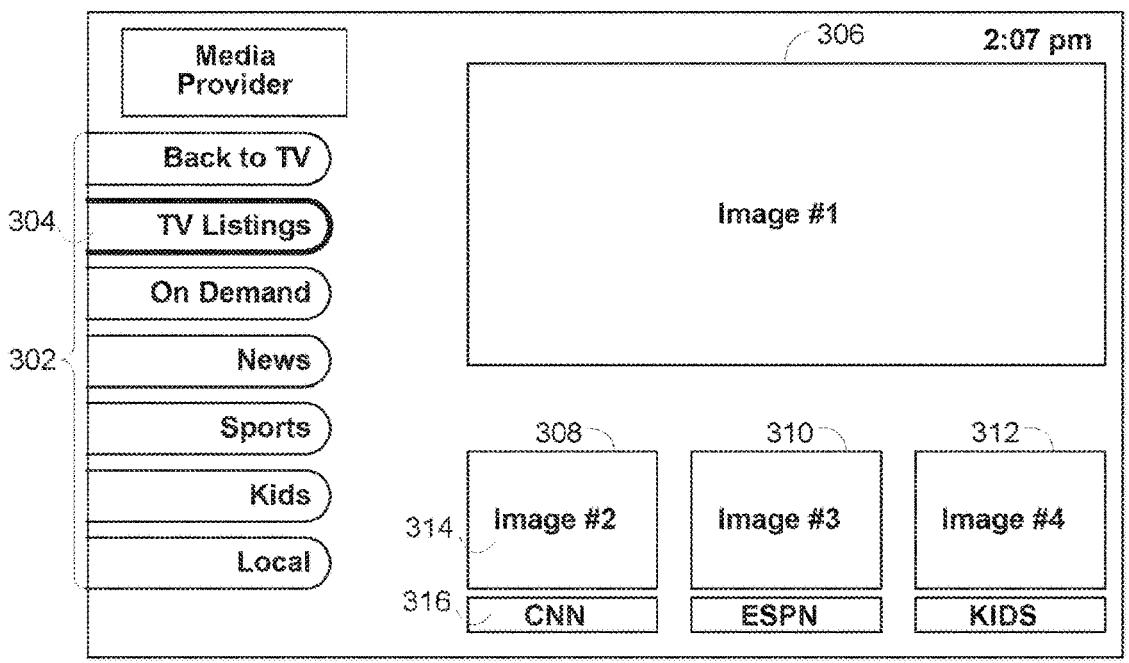
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
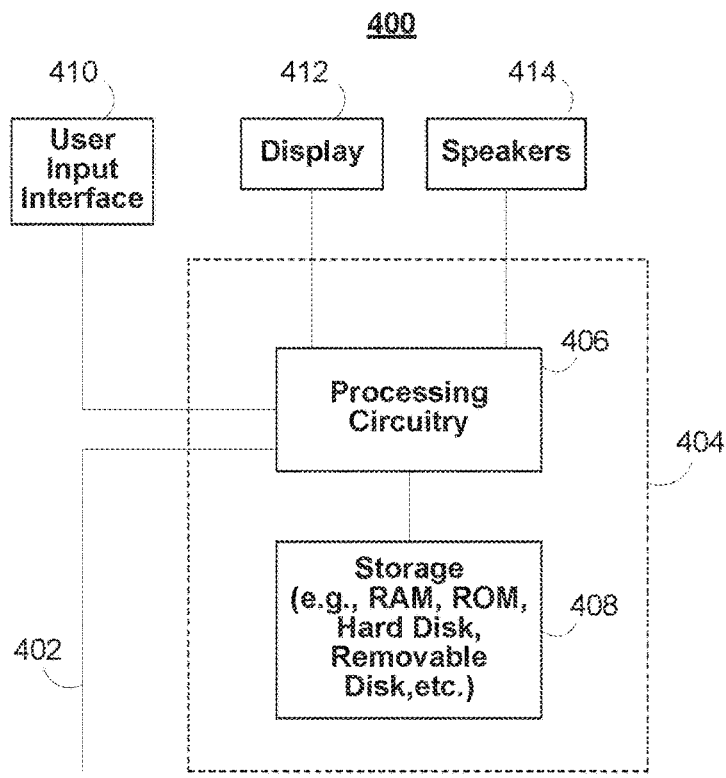
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
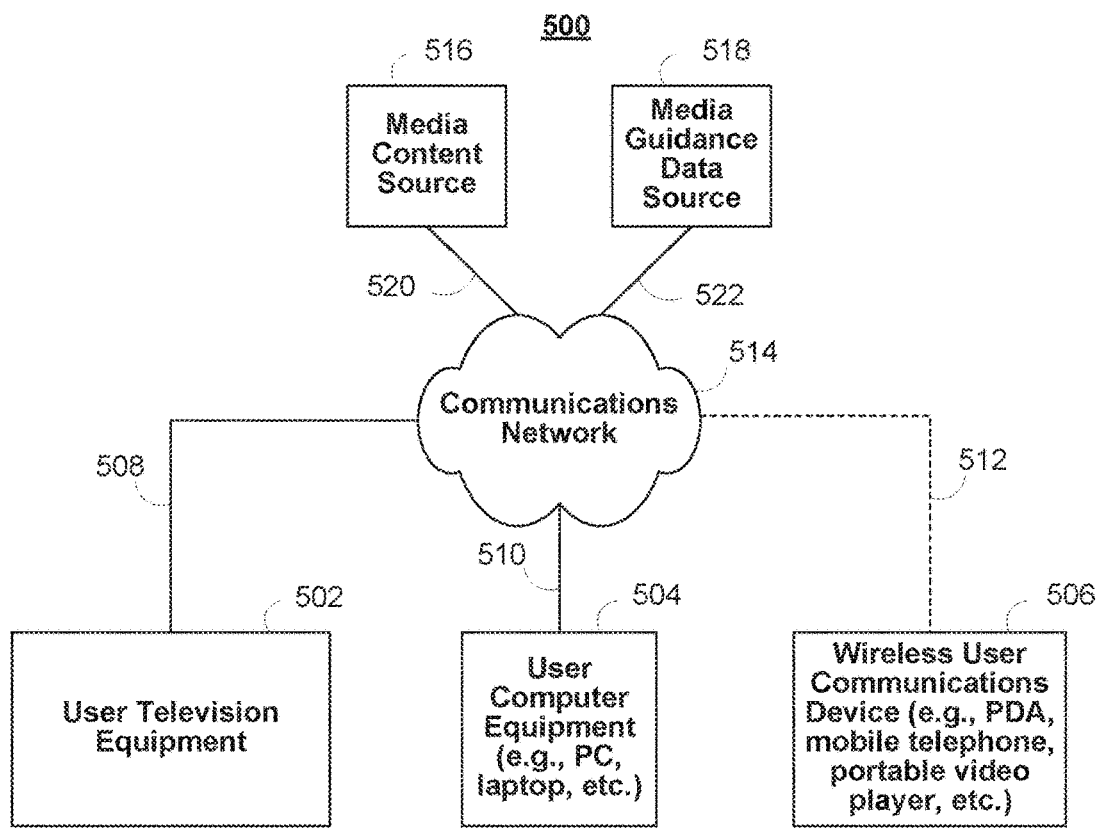
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a web site via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
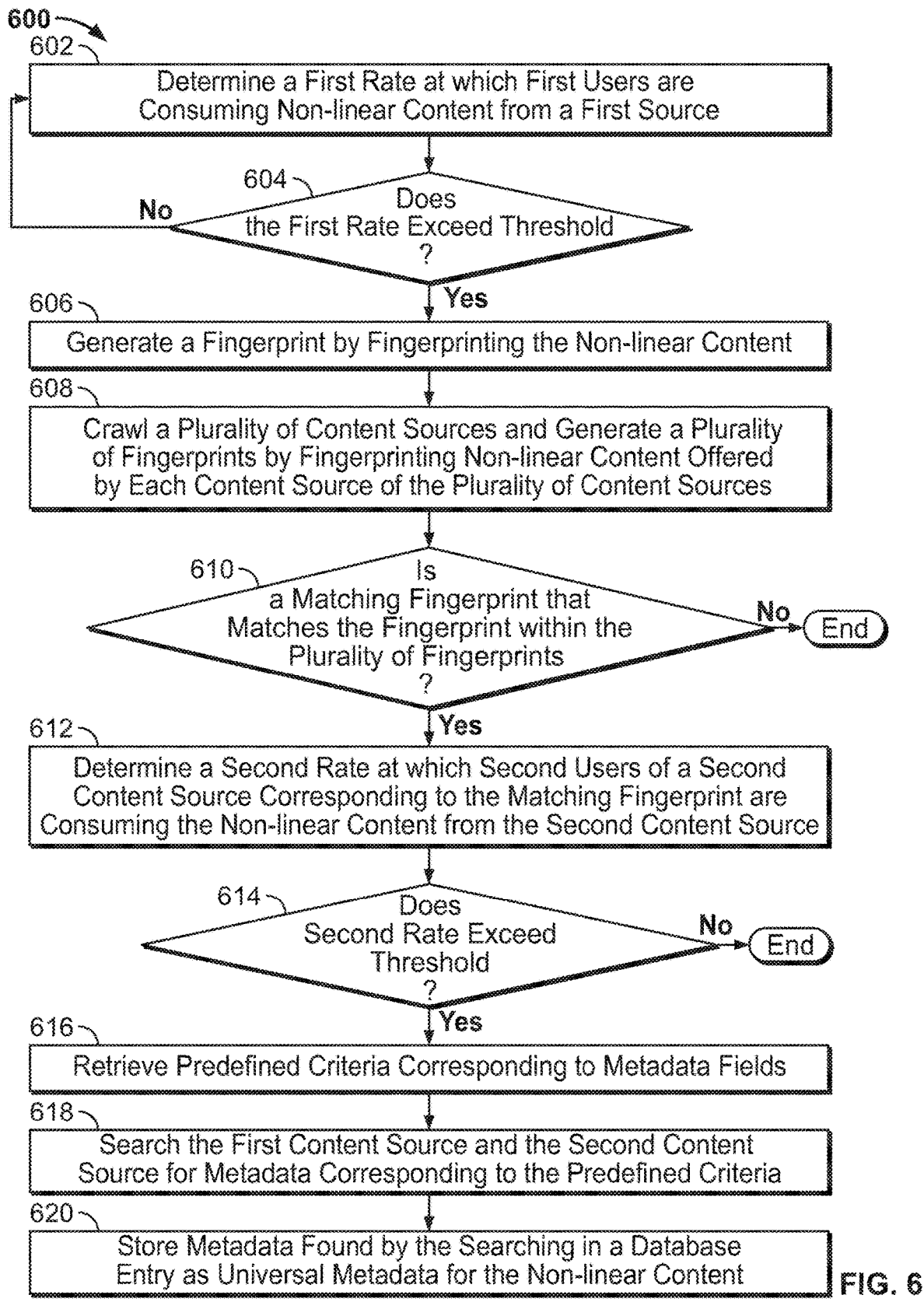
FIG. 6 depicts an illustrative flowchart of a process for automatically generating universal metadata for a viral video, as detected based on fingerprints of the viral video from multiple sources, in accordance with some embodiments of the disclosure.

FIG. 6 depicts an illustrative flowchart of a process for automatically generating universal metadata for a viral video, as detected based on fingerprints of the viral video from multiple sources, in accordance with some embodiments of the disclosure. Process 600 may be executed by control circuitry 404 (e.g., in a manner instructed to control circuitry 404 by the media guidance application). Control circuitry 404 may be part of user equipment (e.g., user television equipment 502, user computer equipment 504, and/or wireless communications device 506), or of a remote server separated from the user equipment by way of communications network 514.

Process 600 begins at 602, where control circuitry 404 determines a first rate at which first users are consuming non-linear content (e.g., a media asset as described above with reference to FIGS. 2-5) from a first source (e.g., media content source 516). At 604, control circuitry 404 determines whether the first rate exceeds a threshold. If the first rate does not exceed the threshold, process 600 reverts to 602, where control circuitry 404 continues to monitor the first rate. If the first rate does exceed the threshold, process 600 proceeds to 606, where control circuitry 404 generates a fingerprint by fingerprinting the non-linear content.

Process 600 continues to 608, where control circuitry 404 causes the media guidance application to crawl a plurality of content sources (e.g., media content sources 516) and generate a plurality of fingerprints by fingerprinting non-linear content offered by each content source of the plurality of content sources. At 610, control circuitry 404 determines whether there is a matching fingerprint that matches the fingerprint within the plurality of fingerprints. If there is no matching fingerprint, control circuitry 404 ends process 600. If there is a matching fingerprint, process 600 continues to 612.

At 612, control circuitry 404 determines a second rate at which second users of a second content source corresponding to the matching fingerprint are consuming the non-linear content from the second content source. At 614, control circuitry 404 determines whether the second rate exceeds the threshold. If the second rate does not exceed the threshold, control circuitry 404 ends process 600. If the second rate exceeds the threshold, process 600 continues to 616.

At 616, control circuitry 404 retrieves predefined criteria corresponding to metadata fields (e.g., from media guidance data source 518 by way of communications network 514). At 618, control circuitry 404 searches the first content source and the second content source (and/or related entries from respective media guidance data source 518 of each content source) for metadata corresponding to the predefined criteria. At 620, control circuitry 404 stores metadata found by the searching in a database entry as universal metadata for the non-linear content (e.g., at storage 408 or media guidance data source 518).

Figure 7:
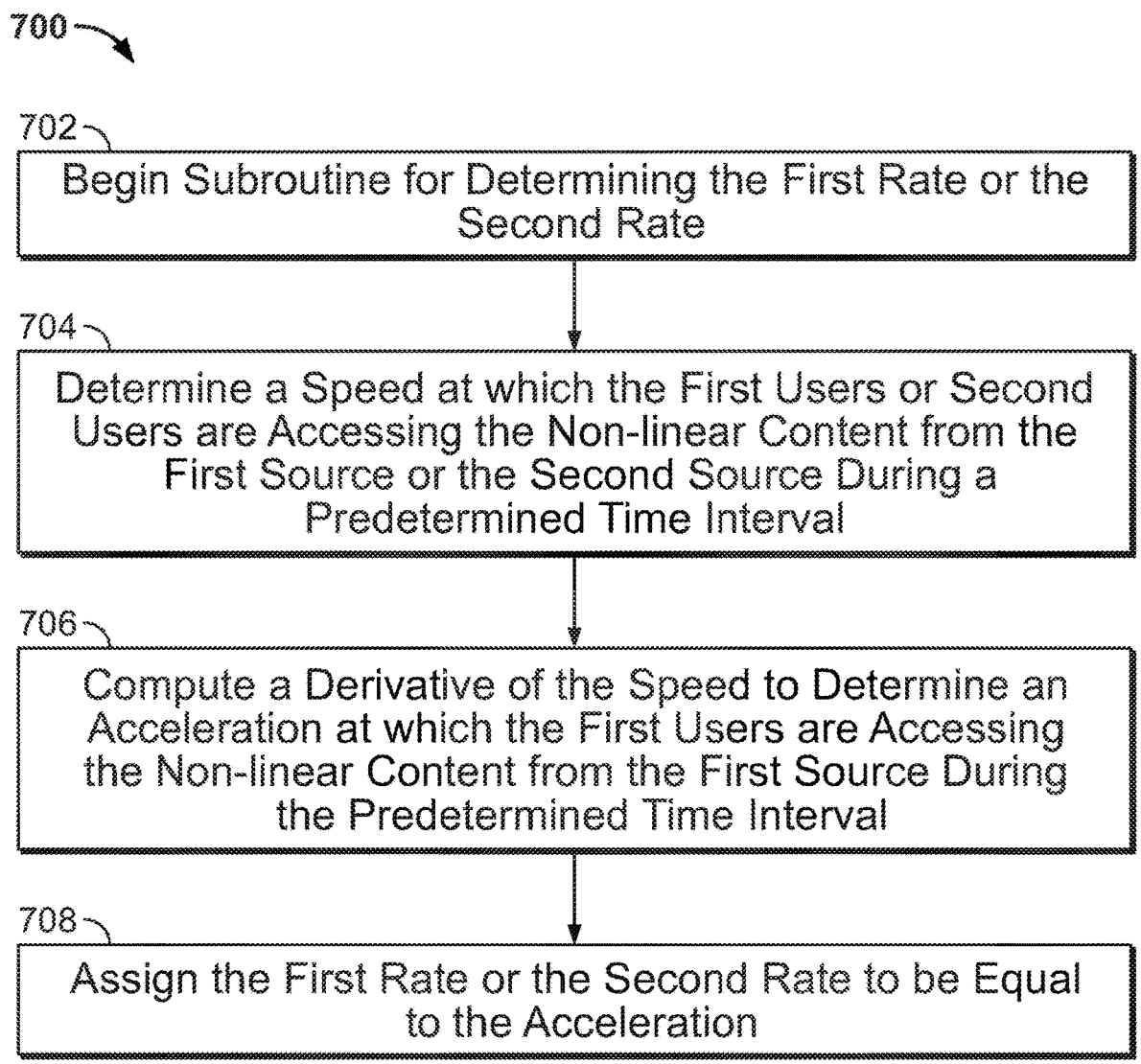
FIG. 7 depicts an illustrative flowchart of a process for determining a rate at which users are accessing non-linear content, in accordance with some embodiments of the disclosure.

FIG. 7 depicts an illustrative flowchart of a process for determining a rate at which users are accessing non-linear content, in accordance with some embodiments of the disclosure. Process 700 may be executed by control circuitry 404 (e.g., in a manner instructed to control circuitry 404 by the media guidance application). Control circuitry 404 may be part of user equipment (e.g., user equipment 100 and/or 110, each of which may have any or all of the functionality of user television equipment 502, user computer equipment 504, and/or wireless communications device 506), or of a remote server separated from the user equipment by way of communications network 514.

Process 700 begins at 702, where control circuitry 404 begins a subroutine for determining the first rate or the second rate (e.g., for resolving 602 or 612). At 704, control circuitry 404 determines a speed at which the first users or second users are accessing the non-linear content from the first source or the second source (e.g., media content source 516) during a predetermined time interval.

At 706, control circuitry 404 computes a derivative of the speed to determine an acceleration at which the first users are accessing the non-linear content from the first source during the predetermined time interval. The predetermined time may be a default time or variable time as indicated by data in storage 408 or media guidance data source 518. Process 700 continues to 708, where control circuitry 404 assigns the first rate or the second rate to be equal to the acceleration.

Figure 8:
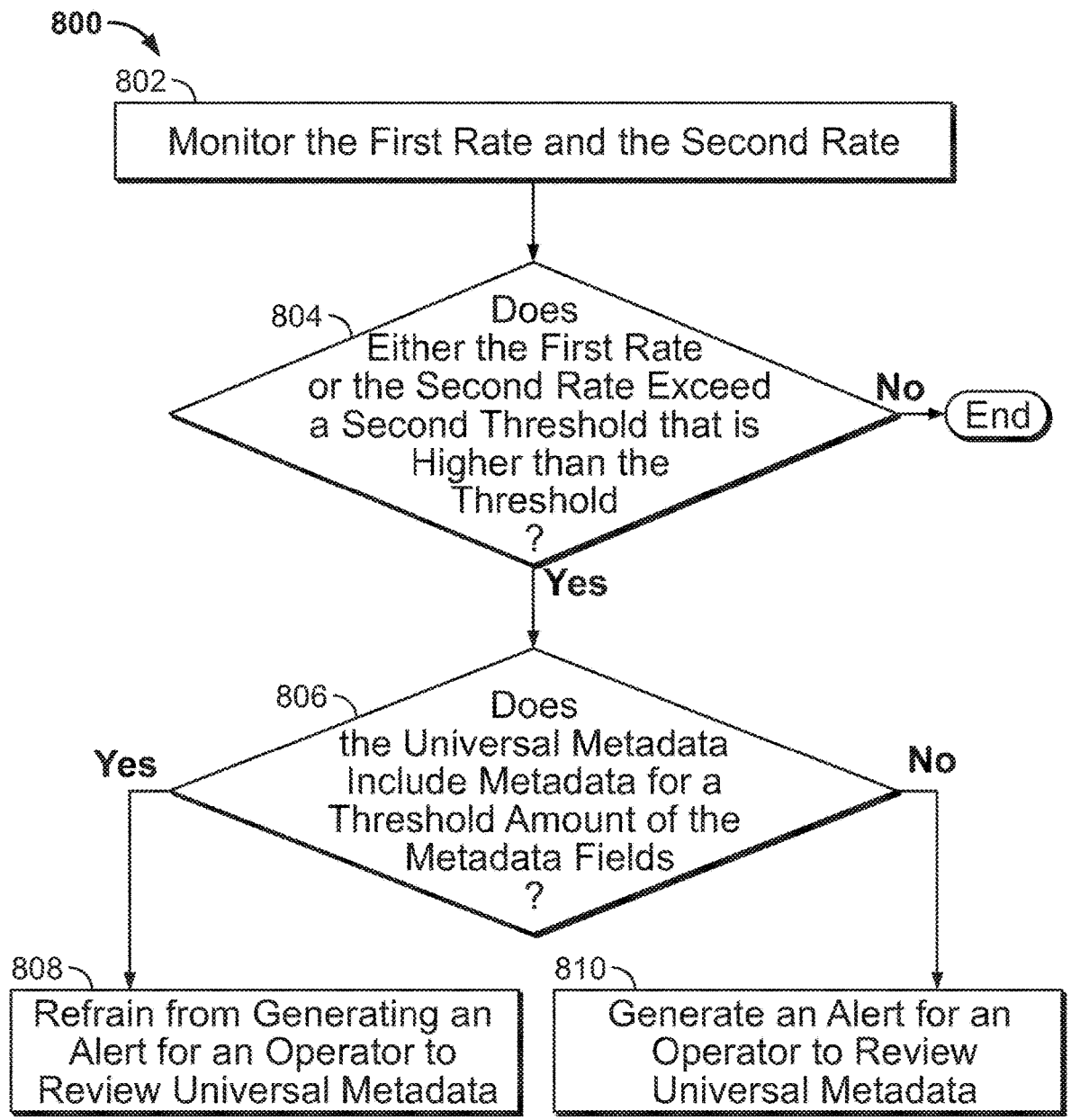
FIG. 8 depicts an illustrative flowchart of a process for determining whether users are accessing non-linear content at a rate high enough to merit alerting an operator to review automatically-generated universal metadata for the non-linear content, in accordance with some embodiments of the disclosure.

FIG. 8 depicts an illustrative flowchart of a process for determining whether users are accessing non-linear content at a rate high enough to merit alerting an operator to review automatically-generated universal metadata for the non-linear content, in accordance with some embodiments of the disclosure. Process 800 may be executed by control circuitry 404 (e.g., in a manner instructed to control circuitry 404 by the media guidance application). Control circuitry 404 may be part of user equipment (e.g., user television equipment 502, user computer equipment 504, and/or wireless communications device 506), or of a remote server separated from the user equipment by way of communications network 514.

Process 800 begins at 802, where control circuitry 404 monitors the first rate and the second rate at which users access the non-linear content from the first source or the second source. At 804, control circuitry 404 determines whether either the first rate or the second rate exceed a second threshold that is higher than the threshold. If control circuitry 404 determines that the first rate or the second rate do not exceed the second threshold, process 800 ends. If, however, control circuitry 404 does exceed the second threshold, process 800 continues to 806.

At 806, control circuitry 404 determines whether the universal metadata includes metadata for a threshold amount of the metadata fields. If the universal metadata does not include metadata for a threshold amount of metadata fields, process 800 continues to 808, where control circuitry 404 refrains from generating an alert (e.g., using display 412 or speakers 414) for an operator to review/edit the universal metadata. If, however, the universal metadata does include metadata for a threshold amount of metadata fields, process 800 continues to 810. At 810, control circuitry 404 generates an alert (e.g., by way of display 412 or speakers 414) for an operator to review the universal metadata. Process 800 may refrain from continuing to 810 until a threshold amount of time has passed. This would enable the media guidance application to attempt to scrape a sufficient amount of universal metadata until the threshold amount of time has been met, before generating an alert for an operator to review the metadata.

It should be noted that processes 600-800 or any step thereof could be performed on, or provided by, any of the devices shown in, or described with respect to, FIGS. 1 and 4-5. For example, any of processes 600-800 may be executed by control circuitry 404 (FIG. 4) as instructed by control circuitry implemented on user equipment 502, 504, 506 (FIG. 5), and/or a user equipment for selecting a recommendation. In addition, one or more steps of processes 600-800 may be incorporated into or combined with one or more steps of any other process or embodiment.

It is contemplated that the steps or descriptions of each of FIGS. 6-8 may be used with any other embodiment of this disclosure. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-8.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining the first rate or the second rate may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, the non-linear content, as described herein, may be stored in, and retrieved from, storage 408 of FIG. 4, or media guidance data source 518 of FIG. 5. Furthermore, processing circuitry, or a computer program, may update attributes of the media guidance application, such as the universal metadata, stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
   determining, by a server, a first rate of content consumption from a first source and a second rate of content consumption from a second source, wherein determining the first rate comprises:
   determining a speed at which the content is accessed from the first source during a predetermined time interval;
   computing a derivative of the speed to determine an acceleration at which the content is accessed from the first source during the predetermined time interval; and
   assigning the first rate to be equal to the acceleration; and
   in response to determining that the second rate exceeds the predetermined threshold:
   generating universal metadata for the content by populating metadata fields with metadata fitting predefined criteria from the first source and the second source; and
   storing the populated metadata fields to entries of a database.

2. The method of claim 1, wherein, continuing to monitor the first rate in response to determining that the first rate does not exceed the predetermined threshold.

3. The method of claim 1, wherein, continuing to monitor the second rate in response to determining that the second rate does not exceed the predetermined threshold.

4. The method of claim 1, wherein, the first rate of content consumption from the first source is consumed by first users.

5. The method of claim 1, wherein, the second rate of content consumption from the second source is consumed by second users.

6. The method of claim 1, wherein the content is non-linear content.

7. The method of claim 1, wherein, the populating of metadata fields with metadata fitting predefined criteria is performed automatically in response to determining that the second rate exceeds the predetermined threshold.

8. The method of claim 1, wherein, the universal metadata is metadata corresponding to a newly identified viral non-linear content that is used to universally identify the content.

9. The method of claim 1, wherein the universal metadata includes a universal identifier.

10. The method of claim 1, wherein, in response to determining that either the first rate or the second rate exceeds the predetermined threshold, generating an alert to be output to an operator.

11. A method comprising:
    determining, by a server, a first rate of content consumption from a first source and a second rate of content consumption from a second source; and
    in response to determining that the second rate exceeds the predetermined threshold:
    generating universal metadata for the content by populating metadata fields with metadata fitting predefined criteria from the first source and the second source, wherein the universal identifier is generated by at least one of:
    assigning a fingerprint to be the universal identifier;
    executing a predefined code script to generate the universal identifier; and
    adding a unit to a base identifier that is sequentially incremented by the unit for each newly generated universal identifier; and
    storing the populated metadata fields to entries of a database.

12. A system, comprising:
    communications circuitry configured to access a first source and a second source; and
    control circuitry configured to:
    determine a first rate of content consumption from a first source and a second rate of content consumption from a second source, wherein determining the first rate comprises:
    determining a speed at which the content is accessed from the first source during a predetermined time interval;
    computing a derivative of the speed to determine an acceleration at which the content is accessed from the first source during the predetermined time interval; and
    assigning the first rate to be equal to the acceleration; and
    in response to determining that the second rate exceeds the predetermined threshold:
    generate universal metadata for the content by populating metadata fields with metadata fitting predefined criteria from the first source and the second source; and
    the communications circuitry configured to access a database for storing the populated metadata fields to entries of the database.

13. The system of claim 12, wherein, continuing to monitor the first rate in response to determining that the first rate does not exceed the predetermined threshold.

14. The system of claim 12, wherein, continuing to monitor the second rate in response to determining that the second rate does not exceed the predetermined threshold.

15. The system of claim 12, wherein, the populating of metadata fields with metadata fitting predefined criteria is performed automatically in response to determining that the second rate exceeds the predetermined threshold.

16. The system of claim 12, wherein the universal metadata includes a universal identifier.

17. The system of claim 16, wherein the universal identifier is generated by at least one of:
    assigning a fingerprint to be the universal identifier;
    executing a predefined code script to generate the universal identifier; and
    adding a unit to a base identifier that is sequentially incremented by the unit for each newly generated universal identifier.

18. The system of claim 12, wherein, in response to determining that either the first rate or the second rate exceeds the predetermined threshold, generating an alert to be output to an operator.

* * * * *

UNITED STATES PATENT AND TRADEMARK OFFICE
CERTIFICATE OF CORRECTION

| | |
|---|---|
| PATENT NO. | : 11,172,270 B2 |
| APPLICATION NO. | : 17/114969 |
| DATED | : November 9, 2021 |
| INVENTOR(S) | : Benjamin H. Maughan et al. |

It is certified that error appears in the above-identified patent and that said Letters Patent is hereby corrected as shown below:

In the Claims

In Claim 1, Line 16, at Column 27, Line 24, please delete "the" that appears before the phrase "predetermined threshold" and insert --a--.

In Claim 11, Line 6, at Column 27, Line 62, please delete "the" that appears before the phrase "predetermined threshold" and insert --a--.

In Claim 12, Line 19, at Column 28, Line 31, please delete "the" that appears before the phrase "predetermined threshold" and insert --a--.

Signed and Sealed this
Tenth Day of January, 2023

Katherine Kelly Vidal
*Director of the United States Patent and Trademark Office*